United States Patent
Lin et al.

(10) Patent No.: US 11,675,136 B2
(45) Date of Patent: Jun. 13, 2023

(54) OPTOELECTRONIC STRUCTURE

(71) Applicant: Advanced Semiconductor Engineering, Inc., Kaohsiung (TW)

(72) Inventors: Jr-Wei Lin, Kaohsiung (TW); Mei-Ju Lu, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 88 days.

(21) Appl. No.: 17/129,644

(22) Filed: Dec. 21, 2020

(65) Prior Publication Data

US 2022/0196918 A1 Jun. 23, 2022

(51) Int. Cl.
*G02B 6/36* (2006.01)
*G02B 6/30* (2006.01)
*G02B 6/42* (2006.01)

(52) U.S. Cl.
CPC ........... *G02B 6/3652* (2013.01); *G02B 6/305* (2013.01); *G02B 6/3636* (2013.01); *G02B 6/4239* (2013.01)

(58) Field of Classification Search
CPC .................................. G02B 6/30; G02B 6/36
See application file for complete search history.

(56) References Cited

U.S. PATENT DOCUMENTS

| | | | | |
|---|---|---|---|---|
| 3,994,559 | A * | 11/1976 | Crow | G02B 6/30 385/130 |
| 6,874,950 | B2 * | 4/2005 | Colgan | G02B 6/3692 385/88 |
| 9,698,564 | B1 * | 7/2017 | Shubin | H01S 5/0206 |
| 9,933,570 | B2 | 4/2018 | Liu | |
| 10,288,812 | B1 * | 5/2019 | Evans | G02B 6/30 |
| 10,295,749 | B1 | 5/2019 | Janta-Polezynski et al. | |
| 11,107,799 | B1 * | 8/2021 | Alapati | H01L 24/48 |
| 2004/0033006 | A1 * | 2/2004 | Farah | G02B 6/3636 385/14 |
| 2011/0075965 | A1 * | 3/2011 | DeMeritt | G02B 6/4214 428/164 |
| 2017/0254954 | A1 * | 9/2017 | Liu | G02B 6/30 |
| 2017/2549648 | | 9/2017 | Ding et al. | |
| 2018/0275342 | A1 * | 9/2018 | Shaw | G02B 6/2821 |
| 2019/0179079 | A1 * | 6/2019 | Potluri | G02B 6/4239 |
| 2021/0157056 | A1 * | 5/2021 | Butler | G02B 6/3652 |

FOREIGN PATENT DOCUMENTS

WO WO-2004086111 A1 * 10/2004 ............... G02B 6/30

* cited by examiner

*Primary Examiner* — Eric Wong
(74) *Attorney, Agent, or Firm* — Foley & Lardner LLP

(57) ABSTRACT

An optoelectronic structure includes a substrate, an electronic die and a photonic die. The electronic die is disposed on the substrate and includes a first surface, wherein the first surface is configured to support an optical component. The photonic die is disposed on the first surface of the electronic die and has an active surface toward the first surface of the electronic die and a side surface facing the optical component.

7 Claims, 17 Drawing Sheets

OPTOELECTRONIC STRUCTURE

BACKGROUND

1. Technical Field

The present disclosure relates generally to an optoelectronic structure. More particularly, the present disclosure relates to an optoelectronic structure for connecting an optical component.

2. Description of the Related Art

The demand for network information has been increased year by year for implementing Cloud services, Internet of Things (IoT), 5G applications, etc. Such applications require high data transmission speed. While being operated at higher and higher speeds and frequencies, traditional cable transmission come up with signal integrity issues due to the high impedance generated by capacitance and inductance of traditional cables. Signal integrity issues limit the transmission distance and power loss performance of traditional cable transmission. In recent years, optical communication is often used to replace traditional cable transmission. In optical communication, optical fibers are used to replace electrically conductive wire between equipment and equipment. However, with the continuous growing demand for higher speed and frequency, it is necessary to shorten the transmission distance of signal traces within equipment to avoid signal integrity at high speed.

In "edge coupling," an optical signal is emitted horizontally from the waveguide. Therefore, the optical coupling action needs to be performed from a horizontal direction. Normally, it is necessary to cut a semiconductor device from a wafer into a unit and to expose the waveguide at a cutting edge. By doing so, the optical signal can be coupled from the edge and connected for light measurement. However, since the optical coupling action is performed from a horizontal direction, it is difficult to perform a wafer-level optical measurement during manufacturing.

In "grating coupling," an optical signal is emitted from the waveguide vertically. Therefore, the optical signal can be directly coupled from the top of the wafer without cutting the wafer into units for measurement. There will not be any special process required for exposing the waveguide, and the optical measurement can be done at wafer-level. However, grating coupling comes up with bandwidth limitations.

One of the difficulties of the optical communication products, such as optical transceiver or optical engine, developed with silicon photonics technology is to guide the optical signal from the waveguide on a silicon photonics device to an optical component, such as optical fiber. The size matching issues between the silicon photonics device and the optical component will result in the problem of energy loss of signals. Therefore, how to couple optical signals has become a key for development, and it is important to improve units per hour (UPH) performance and lower the cost.

The subject application mainly relates high-speed components such as optical communication components, such as optical transceivers, and provide a solution for improving signal integrity of electrical signals at high speeds, thereby achieving higher speed transmission and reducing power loss. The subject application introduces a non-traditional shallow V-groove (or U groove) with passive alignment to achieve a fiber attach technique with the highest UPH performance.

SUMMARY

In some embodiments, an optoelectronic structure comprises: a substrate, an electronic die and a photonic die. The electronic die is disposed on the substrate and comprises a first surface, wherein the first surface is configured to support an optical component. The photonic die is disposed on the first surface of the electronic die and has an active surface toward the first surface of the electronic die and a side surface facing the optical component.

In some embodiments, an optoelectronic structure comprises: a substrate, a first semiconductor die, an optical component and a second semiconductor die. The first semiconductor die is disposed on the substrate and comprises a first surface. The optical component is supported by the first surface of the first semiconductor die. The second semiconductor die is disposed on the first surface of the first semiconductor die, and has an active surface toward the first surface of the first semiconductor die and a side surface toward the optical component, wherein the second semiconductor die further comprises an optical waveguide exposed from the side surface for transferring lights from or into the optical component.

In some embodiments, a method for manufacturing an optoelectronic structure comprises following operations. An electronic die comprising a first surface is provided. A photonic die comprising an active surface is provided. The photonic die is disposed onto the first surface of the electronic die, wherein the active surface of photonic die faces the first surface of the electronic die. An optical component is disposed onto the first surface of the electronic die.

Figure 1:
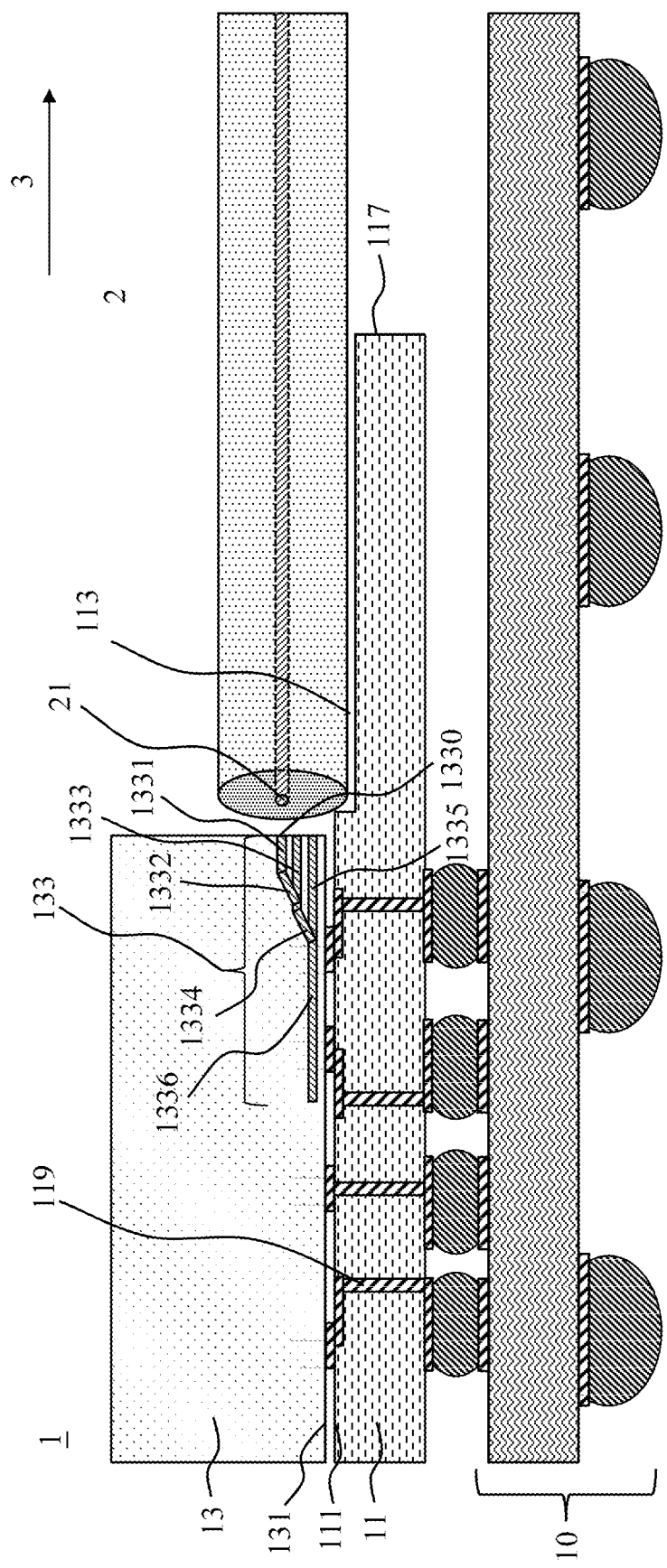
FIG. 1 illustrates a cross-sectional view of an optoelectronic structure in accordance with some embodiments of the present disclosure.

Common reference numerals are used throughout the drawings and the detailed description to indicate the same or similar components. The present disclosure will be more apparent from the following detailed description taken in conjunction with the accompanying drawings.

DETAILED DESCRIPTION

As used herein, relative terms, such as "inner," "interior," "outer," "exterior," "top," "bottom," "front," "back," "upper," "upwardly," "lower," "downwardly," "vertical," "vertically," "lateral," "laterally," "above," and "below," refer to an orientation of a set of components with respect to one another; this orientation is in accordance with the drawings, but is not required during manufacturing or use.

As used herein the term "active surface" may refer to a surface of an electronic component on which contact terminals such as contact pads are disposed, and the term "inactive surface" may refer to another surface of the electronic component opposite to the active surface on which no contact terminals are disposed.

Present disclosure provides an optoelectronic structure in silicon photonic (SiPh) technology realizing high speed signal transmission, for example, greater than 400 Gbit/s. At least one of the electrical signals is first sent to an electronic IC (EIC) for amplification, and then arriving at a photonic IC (PIC). For example, EIC may include both active semiconductor devices and passive circuit components and the electrically conductive paths interconnecting the active semiconductor devices and passive circuit components in electrical circuit relationships for performing a desired sub-circuit control function. PIC may include a combination of photonic devices in a circuit on a single substrate to achieve a desired function. For example, PIC may include lasers, receivers, waveguides, detectors, semiconductor optical amplifiers (SOA), gratings, and other active and passive semiconductor optical devices on a single substrate. An optoelectronic structure has been developed for a requirement of connecting an optical fiber with a photonic IC. However, forming a groove on a photonic IC for positioning the optical fiber may lead to crack or broken of the photonic wafer since a photonic wafer is usually composed of oxide layers, silicon layers and metal layers. Further, a groove formed on a PIC may also intensify the warpage of the PIC due to the CTE (coefficient of thermal expansion) mismatch between the layers. In order to solve aforementioned problems, a new optoelectronic structure is required.

FIG. 1 illustrates a cross-sectional view of an optoelectronic structure 1 in accordance with some embodiments of the present disclosure. In some embodiments, an optoelectronic structure 1 comprises: a substrate 10, an electronic die 11 and a photonic die 13. The substrate 10 may include a conductive substrate with circuitry formed therein. The substrate 10 may be electrically connected to the electronic die 11, and configured to build an electrical connection to an external electronic component such as a printed circuit board (PCB). In some embodiments, the electronic die 11 receives power from the substrate 10 and then provides a driving signal to the photonic die 13. The electronic die 11 is disposed on the substrate 10 and comprises a first surface 111, wherein the first surface 111 is configured to support an optical component 2. In some embodiments, the electronic die 11 may also be referred to as a first semiconductor die. The photonic die 13 is disposed on the first surface 111 of the electronic die 11 and has an active surface 131 toward the first surface 111 of the electronic die 11 and a side surface facing the optical component 2. The photonic die 13 may also be referred to as a second semiconductor die. In some embodiments, the electronic die 11 comprises a trench 113 recessed from the first surface 111 for positioning the optical component 2.

In some embodiments, the electronic die 11 comprises a through via 119 for electrically connecting the first surface 111 of the electronic die 11 to the substrate 10. To implement the through via 119 in the electronic die 11, the thickness of the electronic die 11 should be carefully controlled to, for example, less than 100 μm. Although an electronic die is less likely to suffer from CTE mismatch between different layers in comparison with a photonic die, forming a trench 113 with a depth relatively large with respect to the thickness of the electronic die 11 may still lead to crack or broken of the electronic die 11. Therefore, the depth of the trench should not be too deep to maintain the structural integrity of the electronic die 11. However, on the other hand, if the depth of the trench 113 is too shallow, the trench 113 will not be able to sufficiently position the optical component 2. To maintain the structural integrity of the electronic die 11 and sufficiently position the optical component 2, in some embodiments, a depth of the trench 113 is about one sixth to about one fifth of a radius of the optical component 2. In some embodiments, the depth of the trench 113 is about 10 μm. In some embodiments, the depth of the trench 113 is about 12 μm. In some embodiments, the depth of the trench 113 is about 15 μm. In some embodiments, the width of the trench 113 is about 14.5 μm.

In some embodiments, the optical component 2 comprises an optical fiber. In some embodiments, the optical component 2 extends in a first direction 3 through an edge 117 of the electronic die 11. In some embodiments, a length of the electronic die 11 in the first direction 3 is larger than a length of the photonic die 13 in the first direction 3.

In cases of complex optical transmission systems, optical interconnects between optical fiber and the photonic dies happen frequently in the whole system, so efficient fiber-to-chip coupling is an important factor to pay attention to for system performance. The size of optical waveguides in the photonic die can be as tiny as about 1 μm while the typical diameter of a single mode fiber (SMF) is around 125 μm with a core diameter near 10 μm. The huge size mismatch between a fiber core and the optical waveguide often causes considerable optical transmission loss when light emitting from the core of the optical fiber enters the silicon optical waveguide directly or when light emitting from the silicon optical waveguide enters the core of the optical fiber directly. Therefore, it is important to deal with such issue in optical interconnects.

In some embodiments, the photonic die 13 comprises an optical waveguide 133 exposed from the side surface of the photonic die 13 for coupling lights from or into the optical component 2. In some embodiments, an end 1330 of the optical waveguide 133 near the optical component is exposed from the side surface of the photonic die 13 for transferring lights from or into the optical component 2. In some embodiments, a geometric center (e.g., a core) 21 of the optical component 2 in a surface perpendicular to the first direction 3 is substantially aligned with the end 1330 in the optical waveguide 133. As mentioned above, the depth of the trench should not be too deep so as to maintain the structural integrity of the electronic die 11, and the depth of the trench 113 should not be too shallow so as to sufficiently position the optical component 2. Therefore, waveguides with the ability to transfer light between different levels may be placed in the photonic dies 13. In some embodiments, the optical waveguide 133 comprises a plurality of waveguides 1331-1336 at different levels of the photonic die 13, wherein each waveguide of the plurality of waveguides 1331-1336 is coupled with at least another waveguide of the plurality of waveguides 1331-1336, wherein the end 1330 of the optical waveguide 133 is at a level substantially aligned with the core 21 of the optical component 2. In some embodiments, the plurality of waveguides 1331-1336 transfer lights from the optical component 2 to the active surface 131 of the photonic die 13. In some embodiments, the plurality of waveguides 1331-1336 transfer lights from the active surface 131 of the photonic die 13 into the optical component 2. The plurality of waveguides 1331-1336 forms a stepped structure as shown in FIG. 1. The stepped structure of the plurality of waveguides 1331-1336 helps transfer lights at different levels of the photonic die 13 to other levels of the photonic die 13 so that the end 1330 of the optical waveguide 133 can be aligned with the core 21 of the optical component 2.

As shown in FIG. 1, in some embodiments, the plurality of waveguides 1331-1336 includes the waveguide 1331, waveguide 1333 and waveguide 1335, each at a respective level of the photonic die 13 and exposed from the side surface of the photonic die 13. By exposing the waveguide 1331, waveguide 1333 and waveguide 1335 at different levels of the side surface of the photonic die 13, the optical waveguide 133 can transfer lights from or into the optical component 2 even if the core 21 of the optical component 2 is not precisely aligned with one of the waveguide 1331, waveguide 1333 and waveguide 1335. In some embodiments, the waveguide 1331 is coupled to the waveguide 1333 through the waveguide 1332. The waveguide 1332 is a tilted waveguide for transferring lights between waveguides in different levels of the photonic die 13. In some embodiments, the waveguide 1333 is coupled to the waveguide 1335 through the waveguide 1334. The waveguide 1334 is a tilted waveguide for transferring lights between waveguides in different levels of the photonic die 13. In some embodiments, the tilted angle of the waveguides 1332 and 1334 is around 10o to 15o so as to minimize the transmission loss. In some embodiments, the waveguide 1336 collects light from the waveguides 1331-1335 or provide lights to the waveguides 1331-1335. In some embodiments, the waveguides 1331-1336 can be manufactured with traditional lithography and etch processes. In some embodiments, the waveguides 1331-1336 can be replaced with any kinds of edge couplers for coupling lights in vertical direction, such as: edge couplers based on cascaded multi-stage tapers, edge couplers with index-matching cladding, edge couplers based on three-dimensional taper, etc.

The trench 113 can also help aligning the core 21 of the optical component 2 with the end 1330 of the optical waveguide 133. If there is not any trench on the electronic die 11 for positioning the optical component 2, the level difference between the core 21 of the optical component 2 and the active surface 131 of the photonic die 13 will be larger and more waveguides at different levels of the photonic die 13 will be needed to transfer light between the core 21 of the optical component 2 and the active surface 131 of the photonic die 13. The core 21 of the optical component 2 positioned in the trench 113 on the electronic die 11 is at a level lower than the core 21 of the optical component 2 not positioned in the trench 113 on the electronic die 11.

In another embodiment, if a trench is formed on a photonic die, the depth of the trench normally should be around or more than 75 μm so as to bury almost half of an optical component into the trench and align a core of the optical component to an active surface of the photonic die. Such a larger depth of the trench is more likely to lead to crack or broken of the photonic die.

In some embodiments, the optical component 2 can be active or passive. In some embodiments, the passive optical component 2 comprises an optical fiber. In some embodiments, the optical component 2 comprises an optical fiber and a laser diode.

In other embodiments as shown in FIG. 1, an optoelectronic structure comprises: a substrate 10, a first semiconductor die 11, an optical component 2 and a second semiconductor die 13. The first semiconductor die 11 is disposed on the substrate 10 and comprises a first surface 111. The optical component 2 is supported by the first surface 111 of the first semiconductor die 11. The second semiconductor die 13 is disposed on the first surface 111 of the first semiconductor die 11, and has an active surface 131 toward the first surface 111 of the first semiconductor die 11 and a side surface toward the optical component 2, wherein the second semiconductor die 13 further comprises an optical waveguide 133 exposed from the side surface for coupling lights from or into the optical component 2. In some embodiments, the optical component 2 is not covered by the second semiconductor die 13.

In some embodiments, the optical waveguide 133 comprises a stepped optical waveguide including cascaded multi-stages waveguides able to transfer light between different levels with a stepped structure. In some embodiments, the optical waveguide 133 comprises a gradient optical waveguide including one or more tapered waveguide(s) able to transfer light between different levels with a gradient structure. In some embodiments, the optical component 2 extends in a first direction 3 through an edge 117 of the first semiconductor die 11. In some embodiments, a geometric center 21 of the optical component 2 in a surface perpendicular to the first direction 3 is substantially aligned with an exposed portion 1331 of the optical waveguide 133. In some embodiments, the end 1330 of the optical waveguide 133 protrudes from the side surface of the photonic die 13.

In some embodiments, a length of the first semiconductor die 11 in the first direction 3 is larger than a length of the second semiconductor die 13 in the first direction 3 so that the second semiconductor die 13 and the optical component 2 can both be disposed on the first semiconductor die 11.

Figure 2:
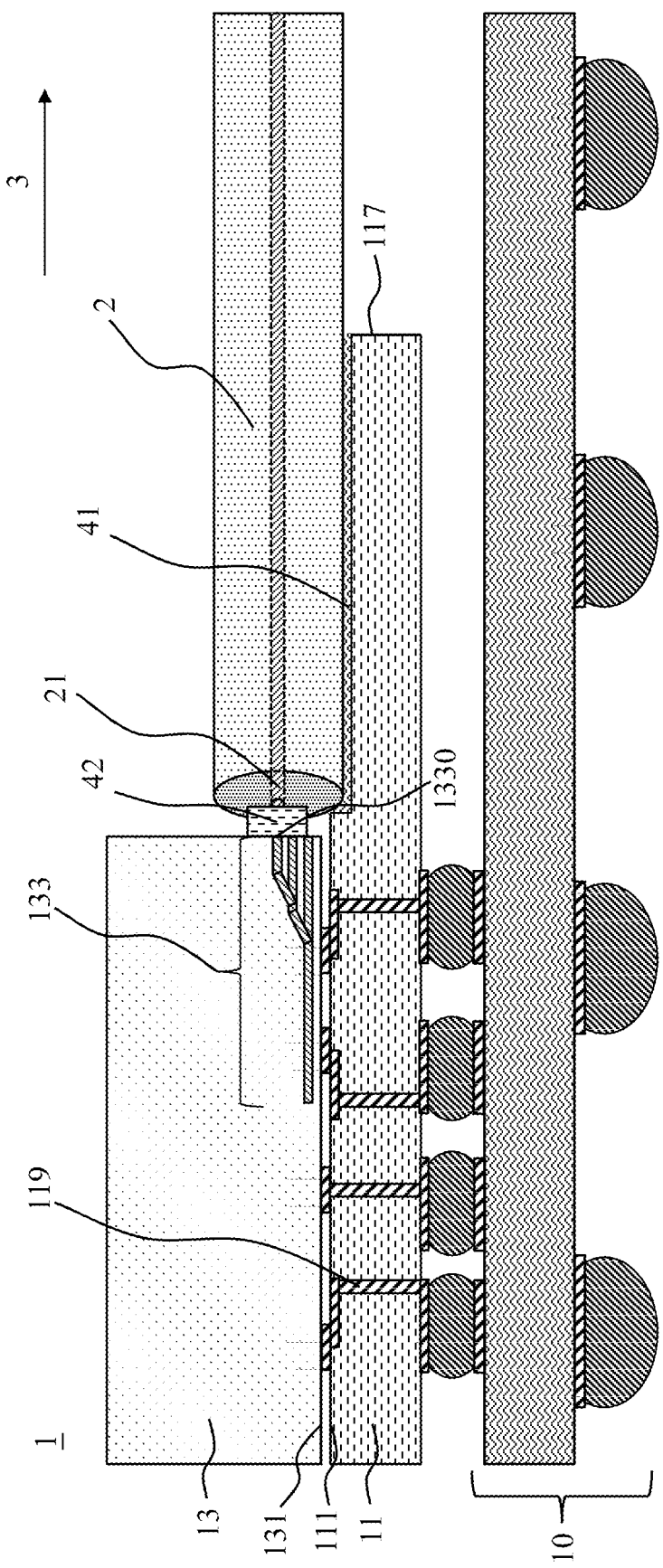
FIG. 2 illustrates a cross-sectional view of an optoelectronic structure in accordance with some embodiments of the present disclosure.

FIG. 2 illustrates a cross-sectional view of an optoelectronic structure in accordance with some embodiments of the present disclosure. The optoelectronic structure 1 in FIG. 2 are similar to the optoelectronic structure 1 in FIG. 1. One of the difference of the semiconductor device package 1 in FIG. 2 lies in that an adhesive 41 is disposed into the trench 113 and between the optical component 2 and bottom surface 1133 of the trench 113.

In some embodiments, the end 1330 of the optical waveguide 133 does not physically contact the optical component 2 so that there may be an air gap between the end 1330 of the optical waveguide 133 and the optical component 2. Therefore, the light transferred from the optical waveguide 133 to the optical component 2 or from the optical component 2 to the optical waveguide 133 may suffer from refraction and/or reflection between two gradual changes, one at the boundary between the end 1330 of the optical waveguide 133 to the air gap and the other at the boundary between the air gap and the optical component 2. To prevent loss due to refraction and/or reflection, another difference of the semiconductor device package 1 in FIG. 2 lies in that the lights is coupled from or into the optical component 2 through an index matching adhesive 42 on the end 1330 of the optical waveguide 133. It would not be possible to directly contact the optical waveguide 133 with the optical component 2 without any air gap between them since the section of the optical component 2 normally is not an ideal vertical plane, but may be a tilted surface. In some embodiments, the index matching adhesive 42 fully fill the air gap between the end 1330 of the optical waveguide 133 and the optical component 2. By using index matching adhesive 42 with proper refractive index, the loss due to refraction and/or reflection is minimized. In some embodiments, the lights is coupled from or into the optical component 2 through an anti-reflective coating (ARC) on the end 1330 of the optical waveguide 133.

Figure 3:
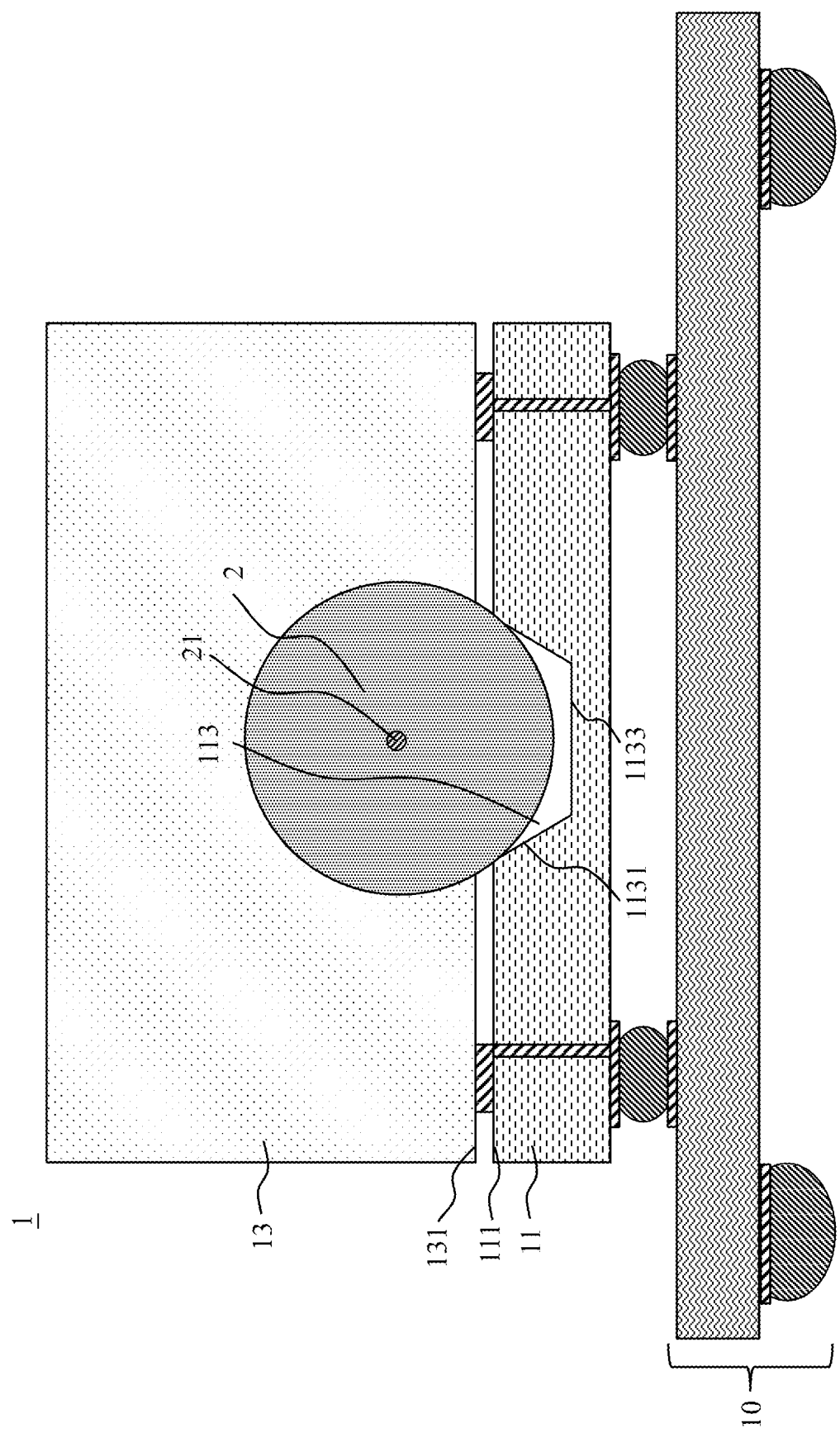
FIG. 3 illustrates a cross-sectional view of the optoelectronic structure in FIG. 1 in a cutting plane at a different angle in accordance with some embodiments of the present disclosure.

FIG. 3 illustrates a cross-sectional view of the optoelectronic structure in FIG. 1 in a cutting plane at a different angle in accordance with some embodiments of the present disclosure. In some embodiments, an optoelectronic structure 1 for connecting an optical component 2 comprises: a substrate 10, an electronic die 11 and a photonic die 13. The electronic die 11 is disposed on the substrate 10 and comprises a first surface 111, wherein the first surface 111 is configured to support the optical component 2. The photonic die 13 is disposed on the first surface 111 of the electronic die 11 and has an active surface 131 toward the first surface 111 of the electronic die 11 and a side surface facing the optical component 2. In some embodiments, the electronic die 11 comprises a through via 119 for electrically connecting the first surface 111 of the first semiconductor die 11 to the substrate 10.

In some embodiments, the electronic die 11 comprises a trench 113 recessed from the first surface 111 for fixing the optical component 2. In some embodiments, the trench 113 comprises a U-groove. In some embodiments, the optical component 2 is in contact with a side wall 1131 of the U-groove 113. In some embodiments, the U-groove 13 has a substantially flat bottom surface 1133. In some embodiments, a depth of the trench 113 is about one sixth to about one fifth of a radius of the optical component 2. In some embodiments, the depth of the trench 113 is about 10 μm. In some embodiments, the depth of the trench 113 is about 12 μm. In some embodiments, the depth of the trench 113 is about 15 μm. In some embodiments, the width of the trench 113 is about 14.5 μm.

Figure 4:
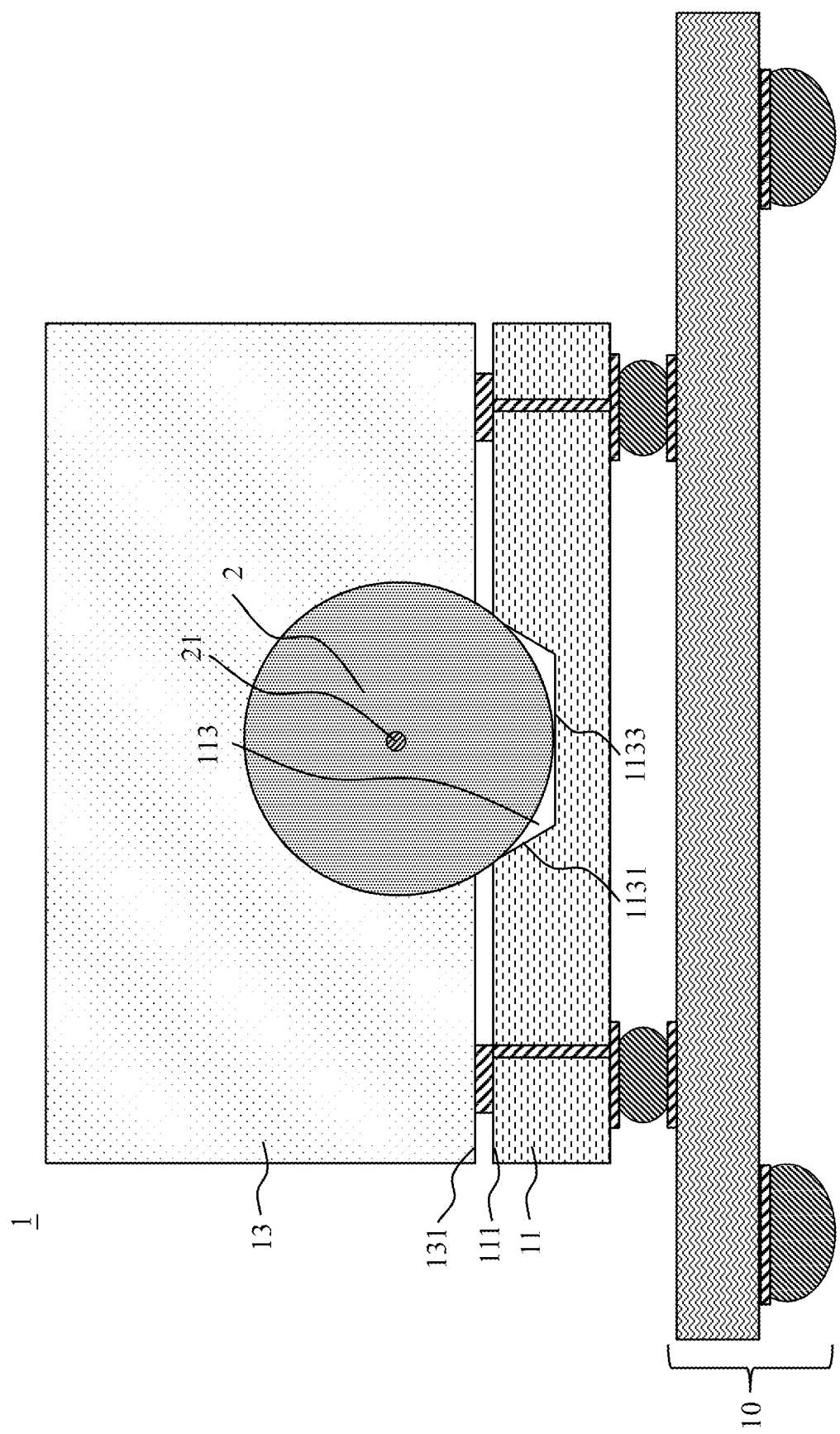
FIG. 4 illustrates a cross-sectional view of an optoelectronic structure in accordance with some embodiments of the present disclosure.

FIG. 4 illustrates a cross-sectional view of an optoelectronic structure in accordance with some embodiments of the present disclosure. The optoelectronic structure 1 in FIG. 4 are similar to the optoelectronic structure 1 in FIG. 3. One of the difference of the semiconductor device package 1 in FIG. 4 lies in that the optical component 2 is in contact with a portion of the substantially flat bottom surface 1133 of the U-groove 113.

Figure 5:
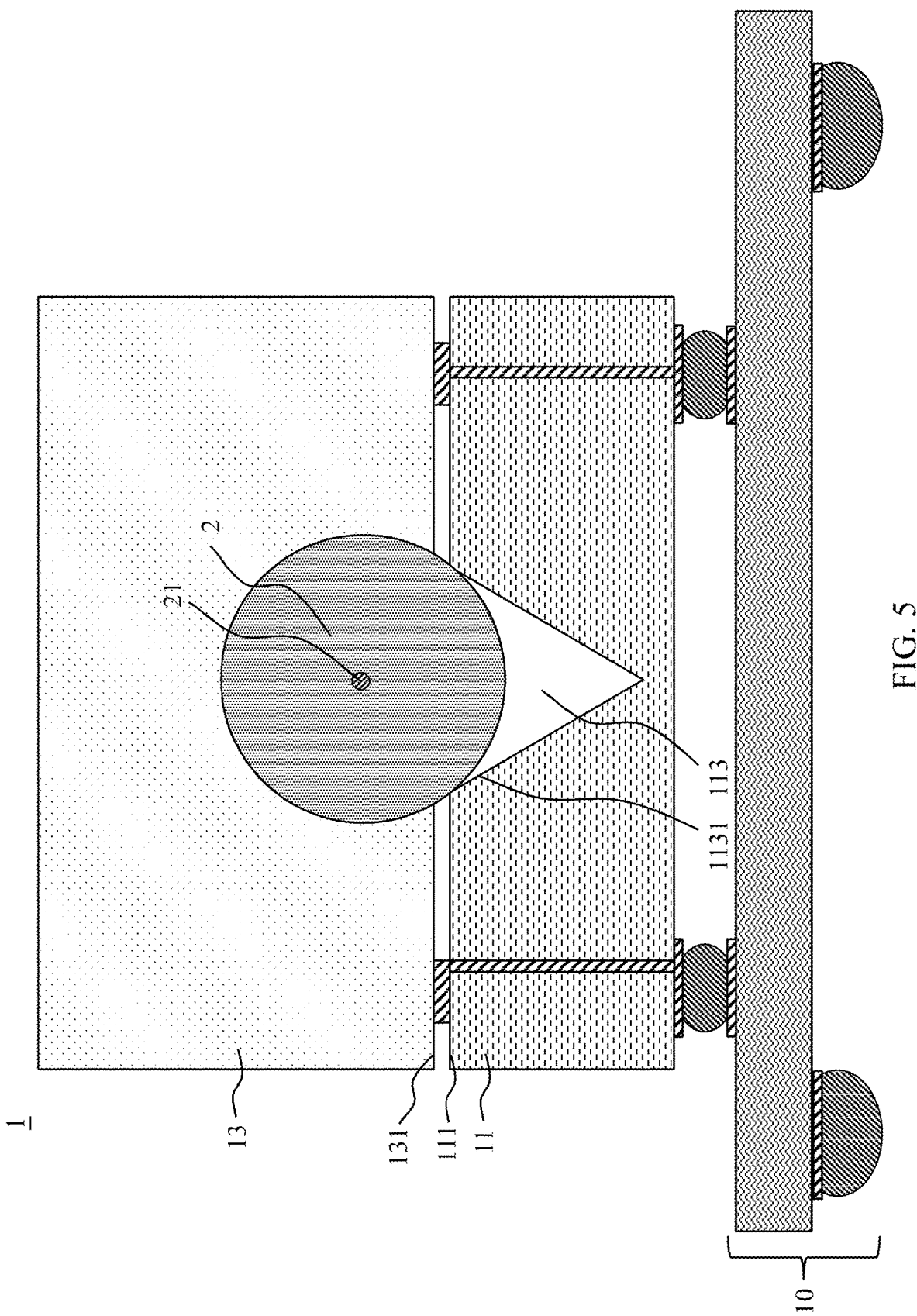
FIG. 5 illustrates a cross-sectional view of an optoelectronic structure in accordance with some embodiments of the present disclosure.

FIG. 5 illustrates a cross-sectional view of an optoelectronic structure in accordance with some embodiments of the present disclosure. The optoelectronic structure 1 in FIG. 5 are similar to the optoelectronic structure 1 in FIG. 3. One of the difference of the semiconductor device package 1 in FIG. 5 lies in that the trench 113 comprises a V-groove. In some embodiments, the optical component 2 is in contact with a side wall 1131 of the V-groove 113.

Figure 6:
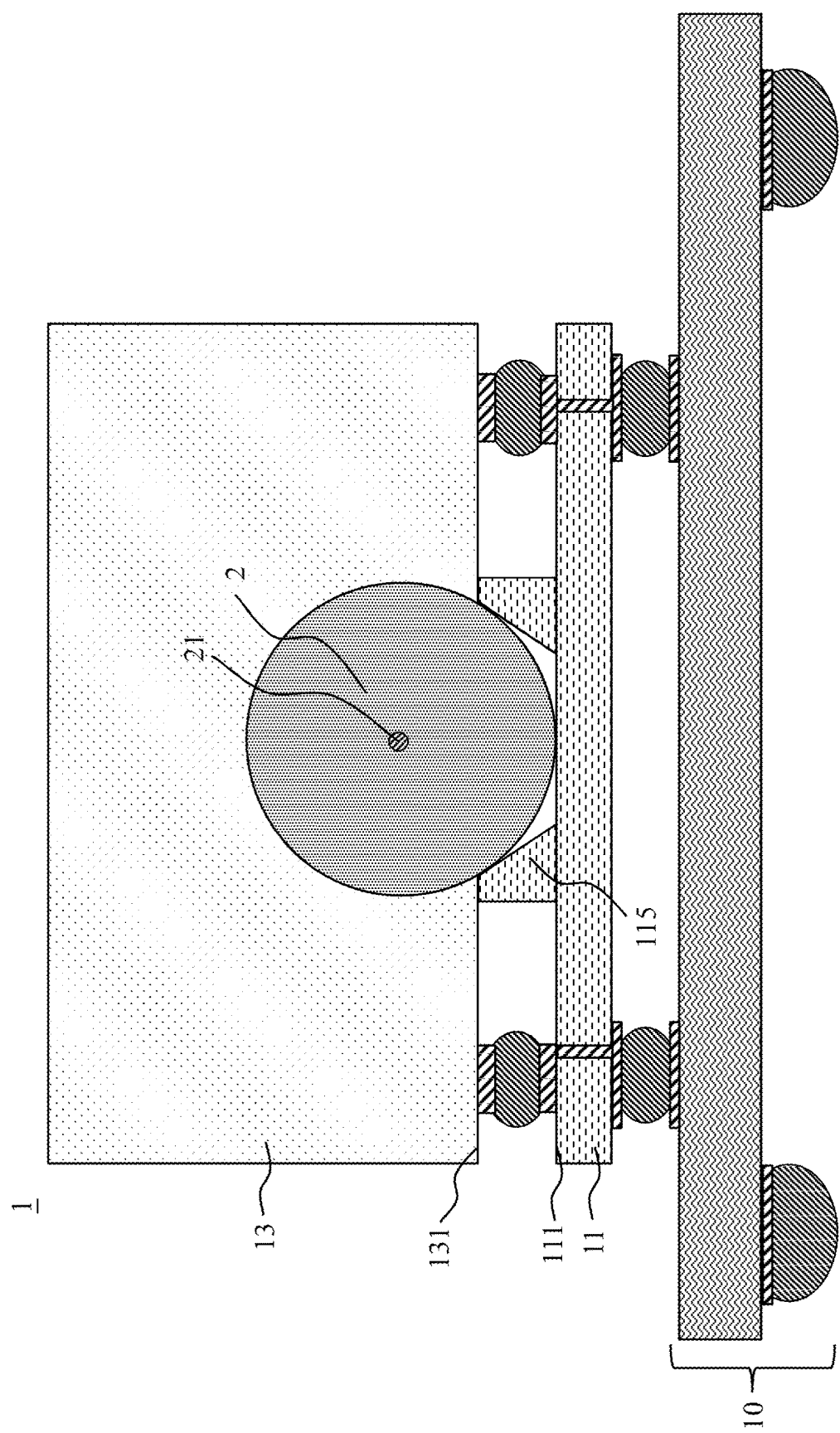
FIG. 6 illustrates a cross-sectional view of an optoelectronic structure in accordance with some embodiments of the present disclosure.

FIG. 6 illustrates a cross-sectional view of an optoelectronic structure in accordance with some embodiments of the present disclosure. The optoelectronic structure 1 in FIG. 6 are similar to the optoelectronic structure 1 in FIG. 3. One of the difference of the semiconductor device package 1 in FIG. 6 lies in that the electronic die 11 comprises a dam 115 protruding from the first surface 111 for positioning the optical component 2. In some embodiments, the electronic die 11 comprises a pair of dams protruding from the first surface 111 for positioning the optical component 2.

Figure 7:
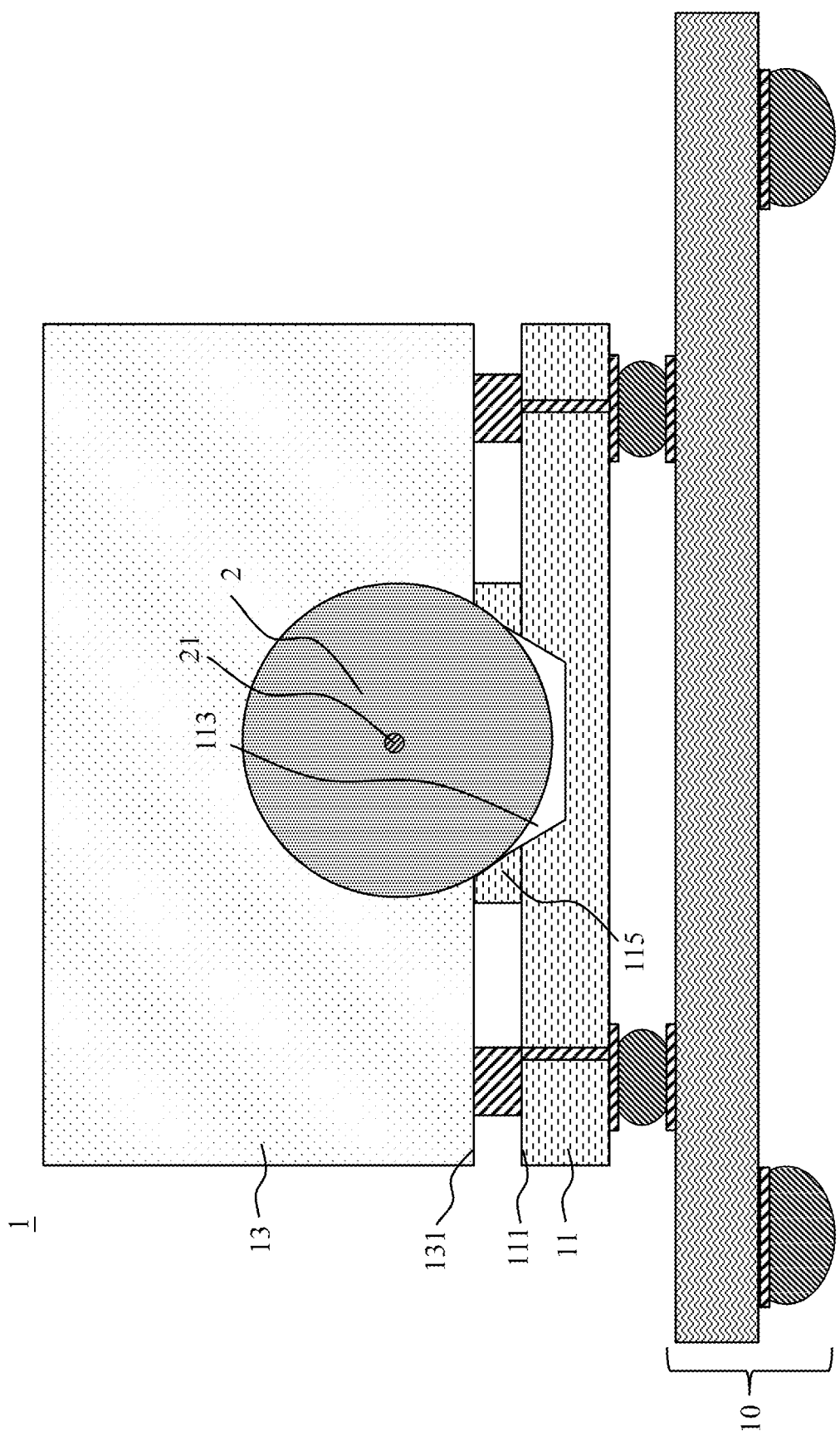
FIG. 7 illustrates a cross-sectional view of an optoelectronic structure in accordance with some embodiments of the present disclosure.

FIG. 7 illustrates a cross-sectional view of an optoelectronic structure in accordance with some embodiments of the present disclosure. The optoelectronic structure 1 in FIG. 7 are similar to the optoelectronic structure 1 in FIG. 6. One of the difference of the semiconductor device package 1 in FIG. 7 lies in that the electronic die 11 comprises a trench 113 recessed from the first surface 111 and a dam 115 protruding from the first surface 111 for positioning the passive optical component 2.

Figure 8:
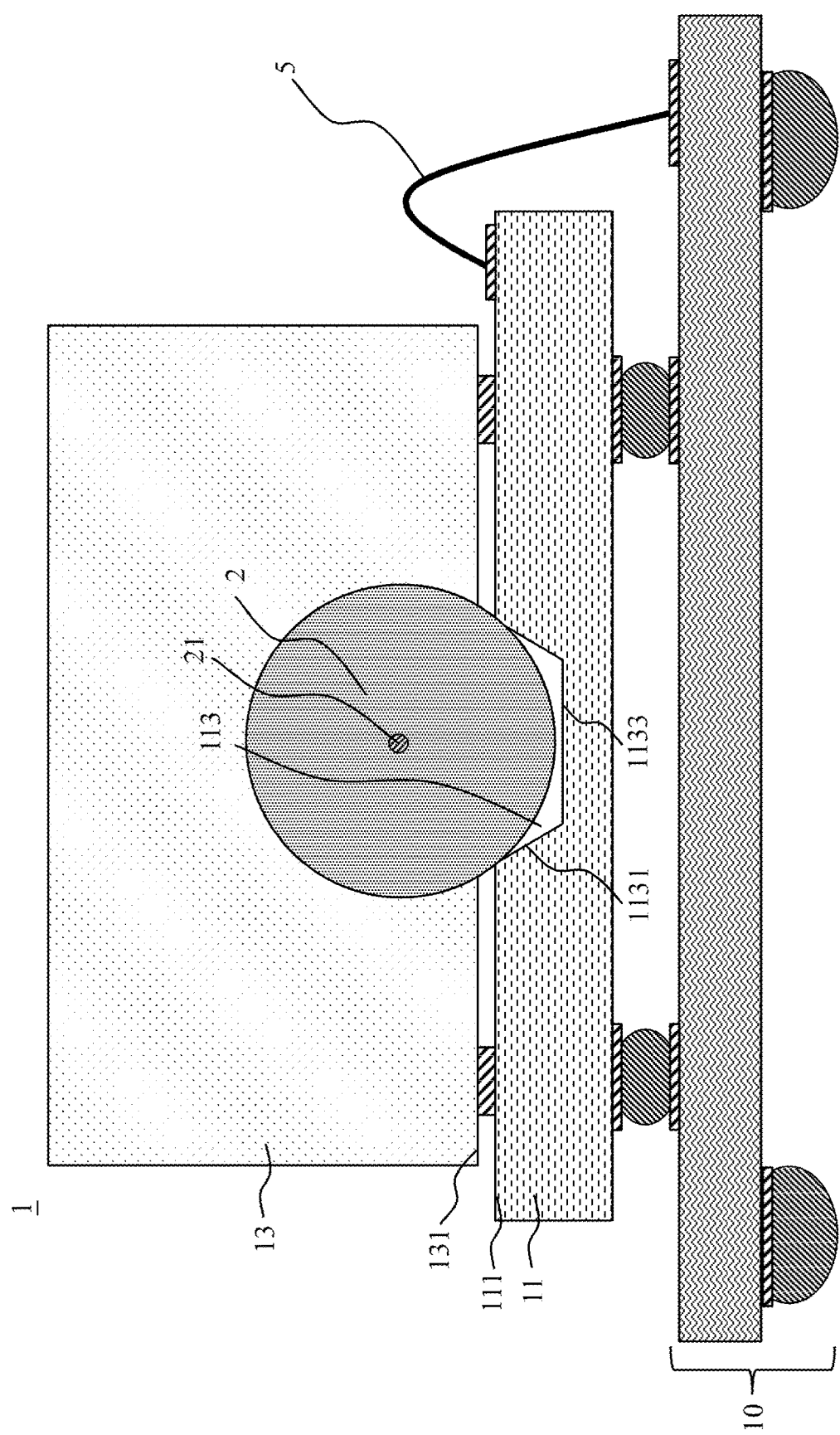
FIG. 8 illustrates a cross-sectional view of an optoelectronic structure in accordance with some embodiments of the present disclosure.

FIG. 8 illustrates a cross-sectional view of an optoelectronic structure in accordance with some embodiments of the present disclosure. The optoelectronic structure 1 in FIG. 8 are similar to the optoelectronic structure 1 in FIG. 3. One of the difference of the semiconductor device package 1 in FIG. 8 lies in that the optoelectronic structure 1 further comprises a wire bond 5 for electrically connecting the first surface 111 of the electronic die 11 to the substrate 10.

FIG. 9A, FIG. 9B, FIG. 9C, FIG. 9D, FIG. 9E, FIG. 9F, FIG. 9G, FIG. 9H and FIG. 9I illustrate a method for manufacturing an optoelectronic structure in accordance with some embodiments of the present disclosure.

Figure 9A:
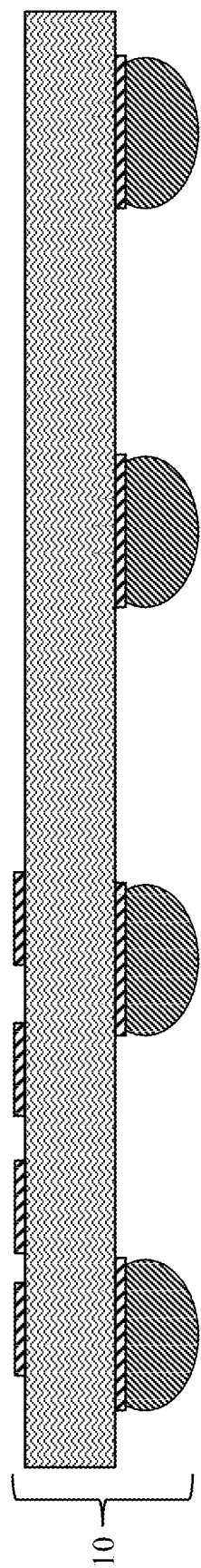
FIG. 9A, FIG. 9B, FIG. 9C, FIG. 9D, FIG. 9E, FIG. 9F, FIG. 9G, FIG. 9H and FIG. 9I illustrate a method for manufacturing an optoelectronic structure in accordance with some embodiments of the present disclosure.

FIG. 9A shows that, in some embodiments, the method for manufacturing an optoelectronic structure comprises providing a substrate 10.

Figure 9B:
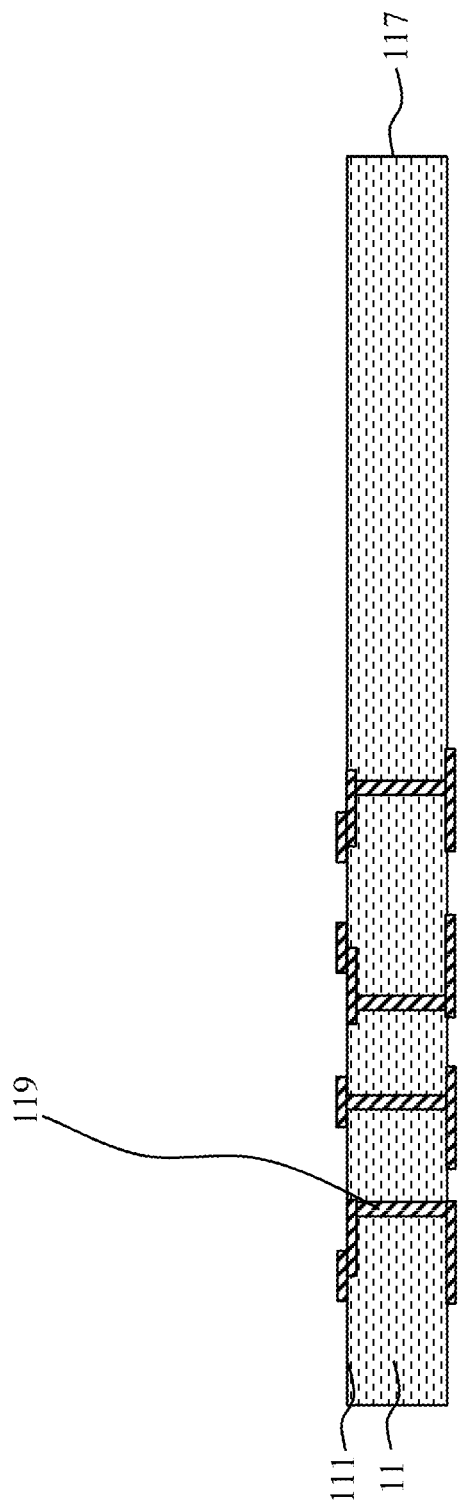

FIG. 9B shows that, in some embodiments, the method comprises providing an electronic die 11 comprising a first surface 111. In some embodiments, the method further comprises forming a through via 119 in the electronic die 11.

Figure 9C:
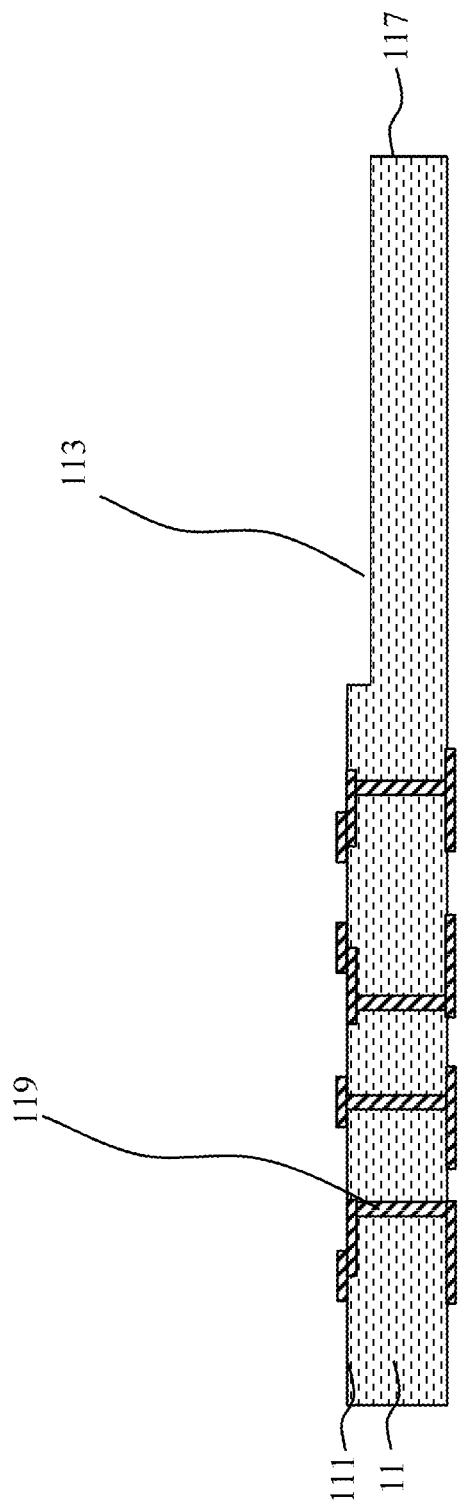

FIG. 9C shows that, in some embodiments, the method further comprises forming a trench 113 in the first surface 111 of the electronic die 11.

Figure 9D:
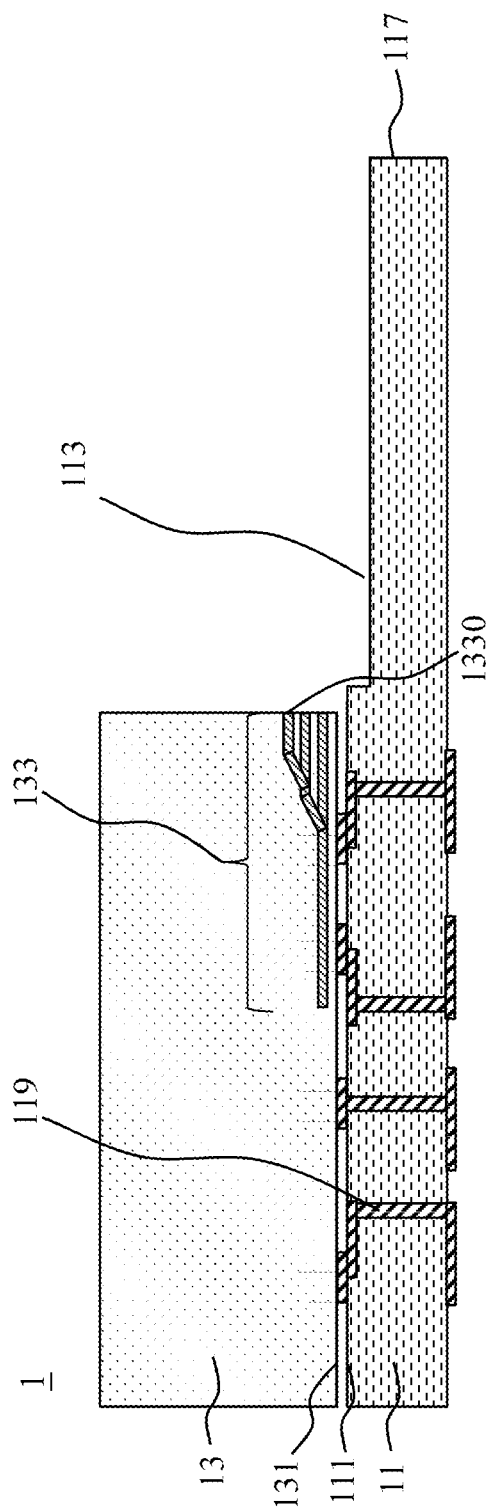

FIG. 9D shows that, in some embodiments, the method comprises providing a photonic die 13 comprising an active surface 131 and disposing the photonic die 13 onto the first surface 111 of the electronic die 11. The active surface 131 of photonic die 13 faces the first surface 111 of the electronic die 11.

Figure 9E:
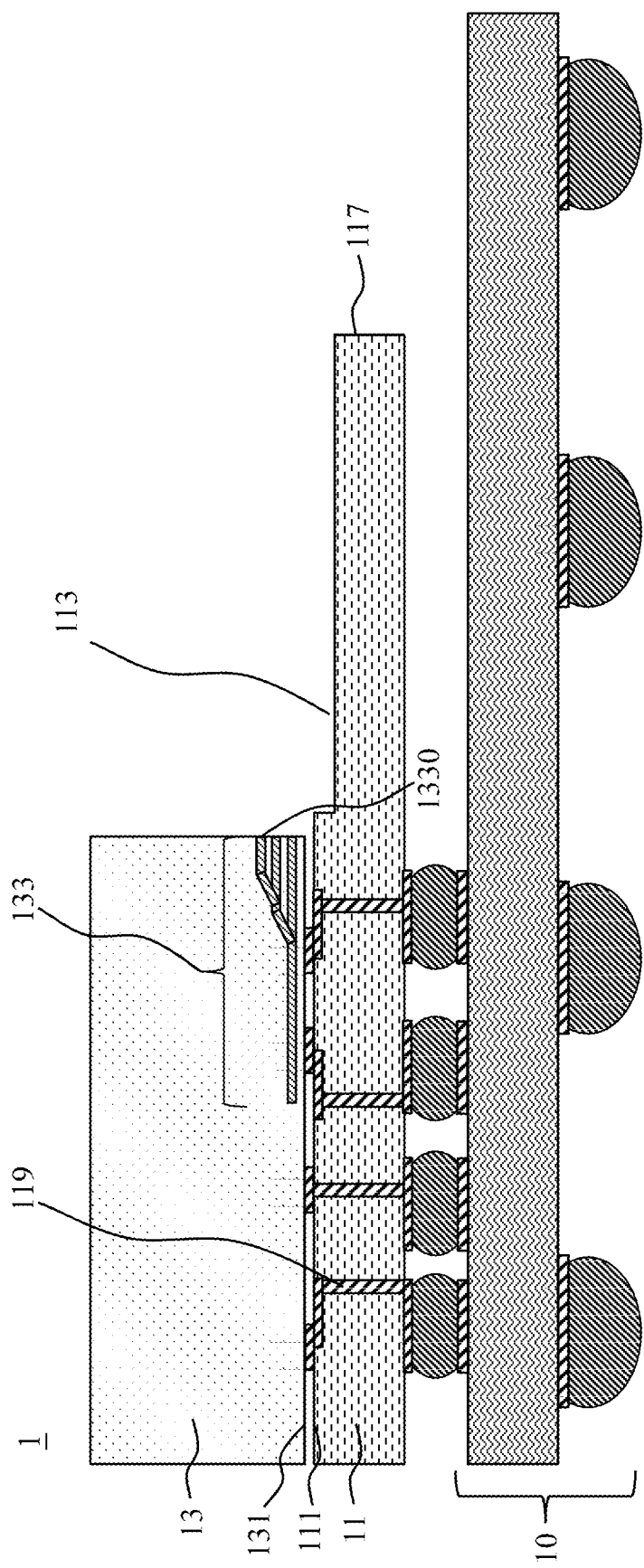

FIG. 9E shows that, in some embodiments, the method further comprises disposing the electronic die 11 and the photonic die 13 onto the substrate 10.

Figure 9F:
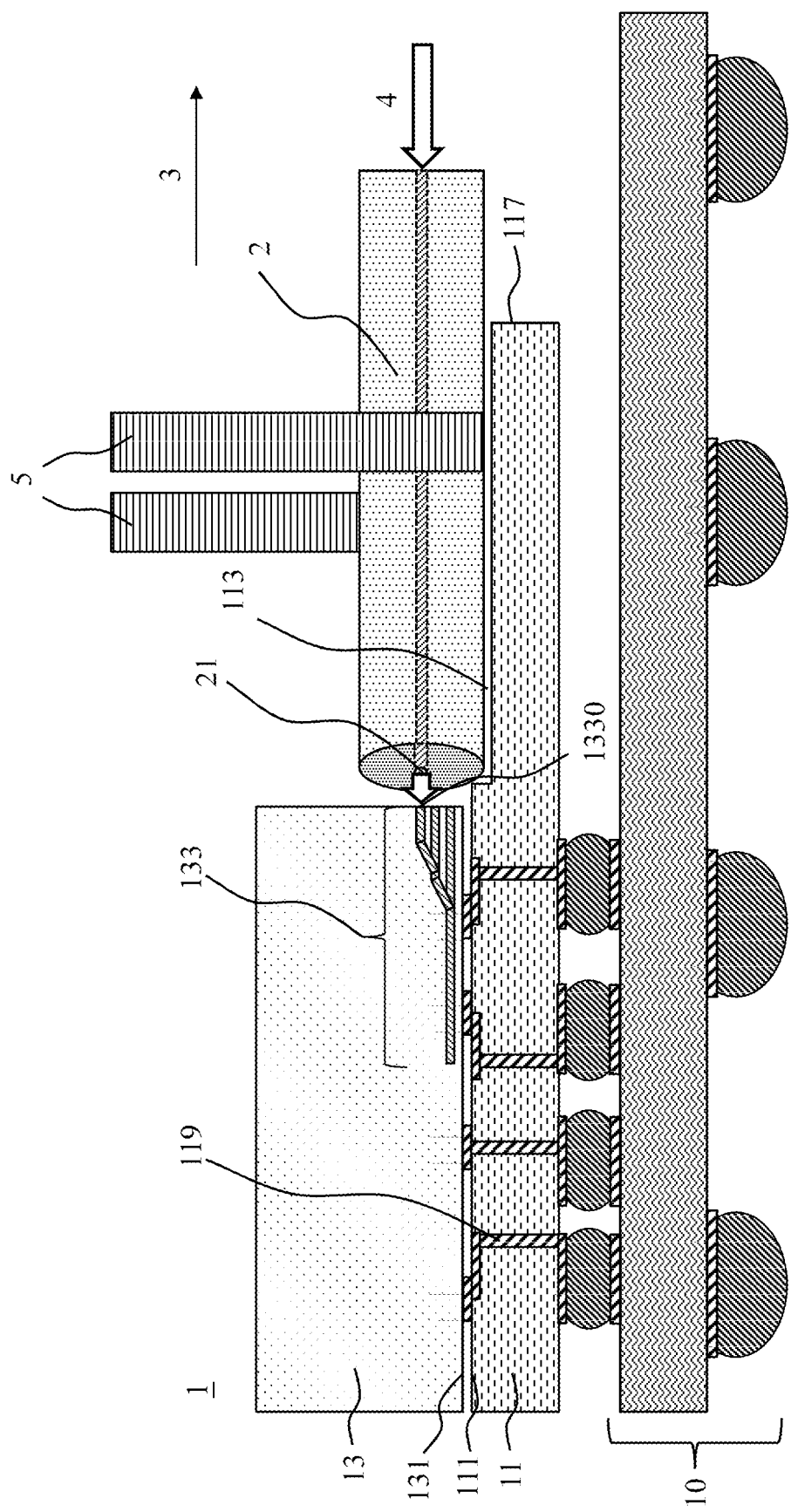

As shown in FIGS. 9F, 9G, 9H and 9I, in some embodiments, the method comprises disposing an optical component 2 onto the first surface 111 of the electronic die 11. In some embodiments, the photonic die 11 is disposed onto the electronic die 13 before the optical component 2 is disposed onto the electronic die 13. In some embodiments, disposing the optical component 2 onto the first surface 111 of the electronic die 11 includes at least partially disposing the optical component 2 in the trench 113 to preliminarily align a core 21 of the optical component 2 with an end 1330 of an optical waveguide 133 exposed from a side surface of the photonic die 13 facing the optical component 2. As shown in FIG. 9F, the optical component 2 is first preliminarily aligned an end 1330 of an optical waveguide 133 exposed from a side surface of the photonic die 13 facing the optical component 2. In the preliminarily alignment, which is also known as passive alignment, a fixture 5 disposes the optical component 2 onto the trench 113. However, the core 21 of the optical component 2 may not be precisely aligned with the end 1330 of the optical waveguide 133 after the preliminarily alignment due to the displacement of the trench, the tilted section of the optical waveguide 133, the skewed optical component 2, etc.

Figure 9G:
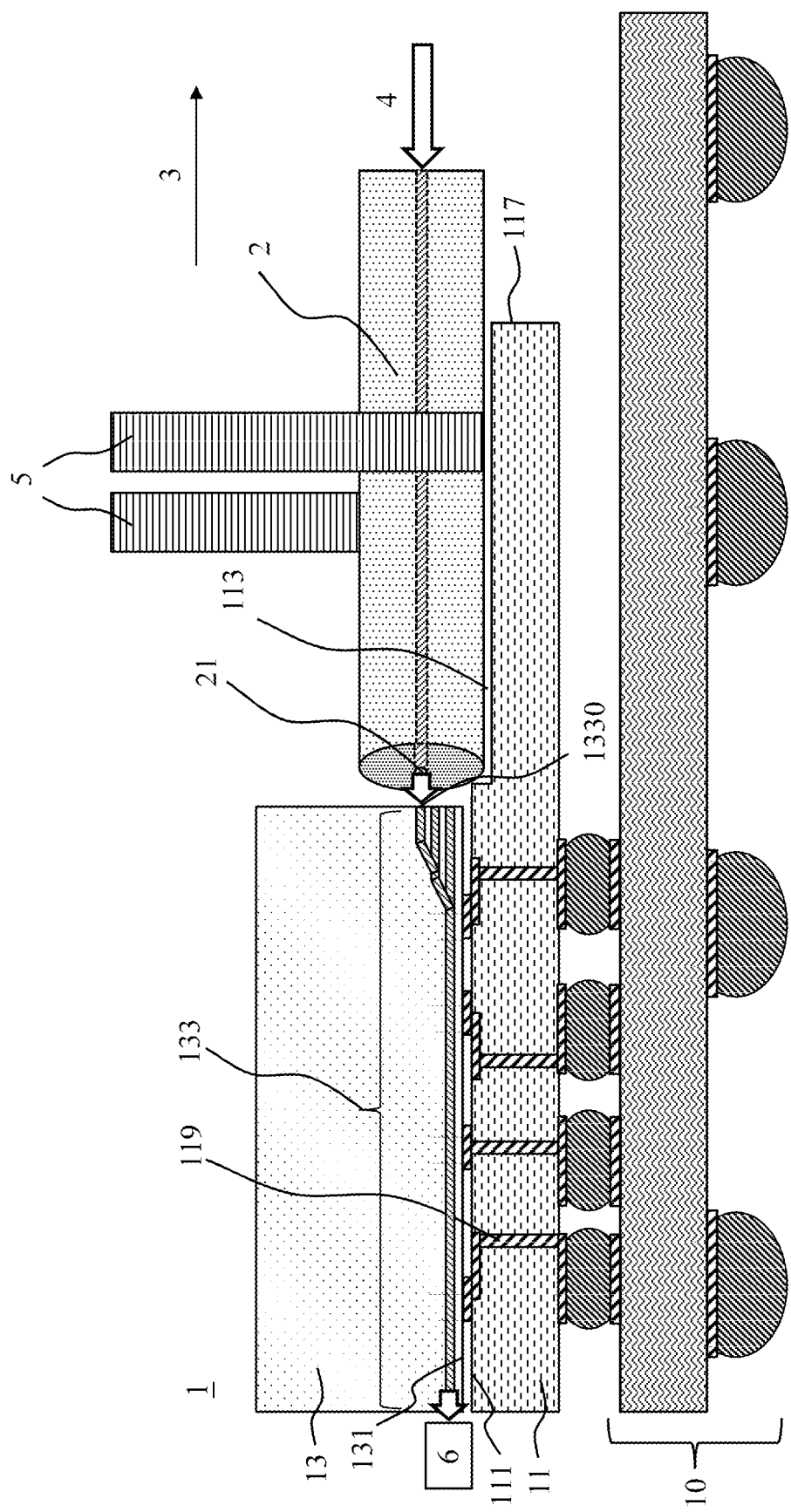

To further align the core 21 of the optical component 2 with the end 1330 of the optical waveguide 133, in some embodiments, the method further comprises aligning the core of the optical component 2 with the end of the optical waveguide with an active alignment process. In an example of an active alignment process as shown in FIG. 9F, a laser beam 4 is applied to an end of the optical component 2. The light from the laser beam 4 passes through the optical component 2 and forms a light spot on the side surface of the photonic die 13. The active alignment process can be completed by probing the electrical signals in the photonic die 13 to make sure that the photonic die 13 receives the light from the laser beam 4. In another example of an active alignment process as shown in FIG. 9G, a laser beam 4 is applied to an end of the optical component 2. The light from the laser beam 4 passes through the optical component 2 and forms a light spot on the side surface of the photonic die 13. The active alignment process can be completed by using an optical sensor 6 for detecting the light passed through the optical waveguide 133 in the photonic die 13 to make sure that the photonic die 13 receives the light from the laser beam 4. In the embodiment shown in FIG. 9G, the optical waveguide 133 extends through the photonic die 13 so as to provide a detection end at the side surface of the photonic die 13 away from the optical component 2.

Figure 9H:
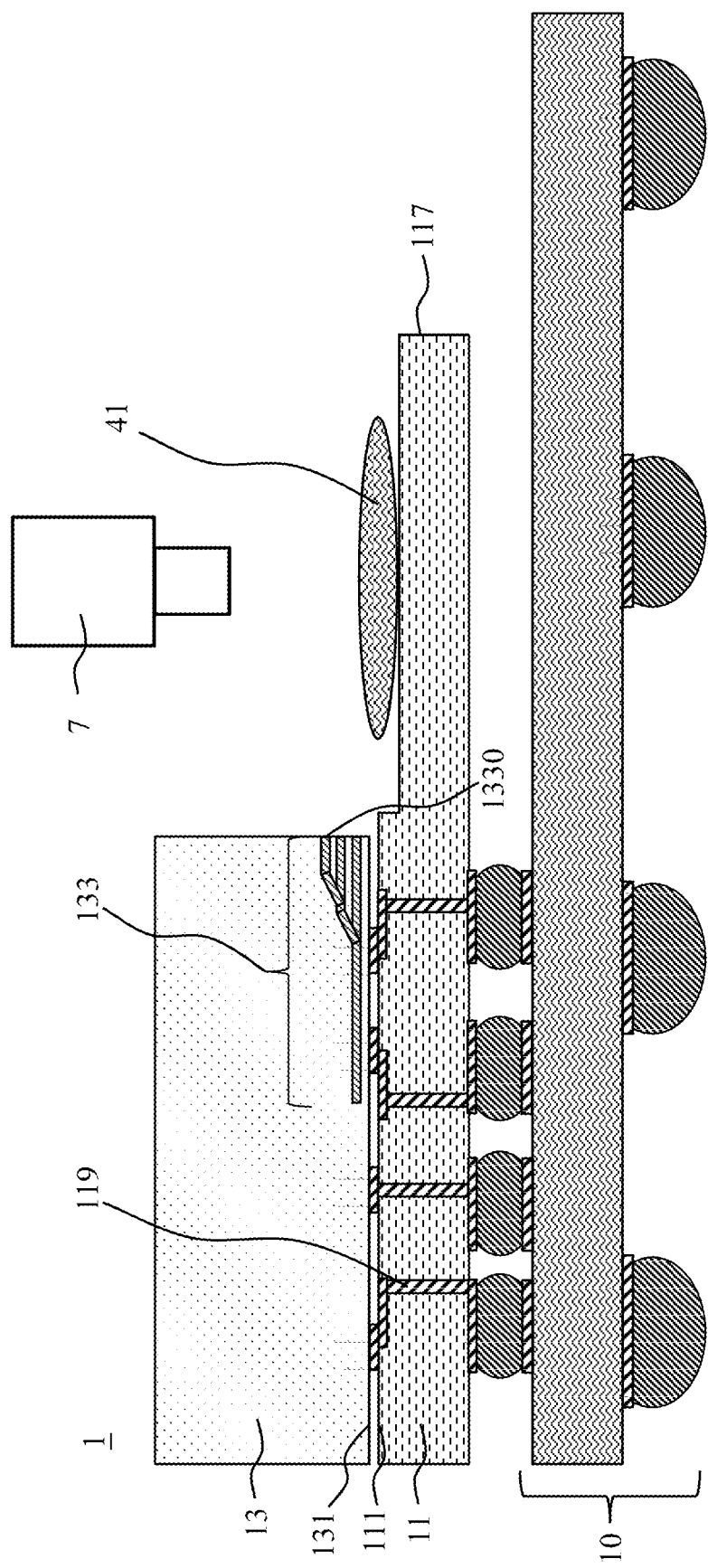
Figure 9I:
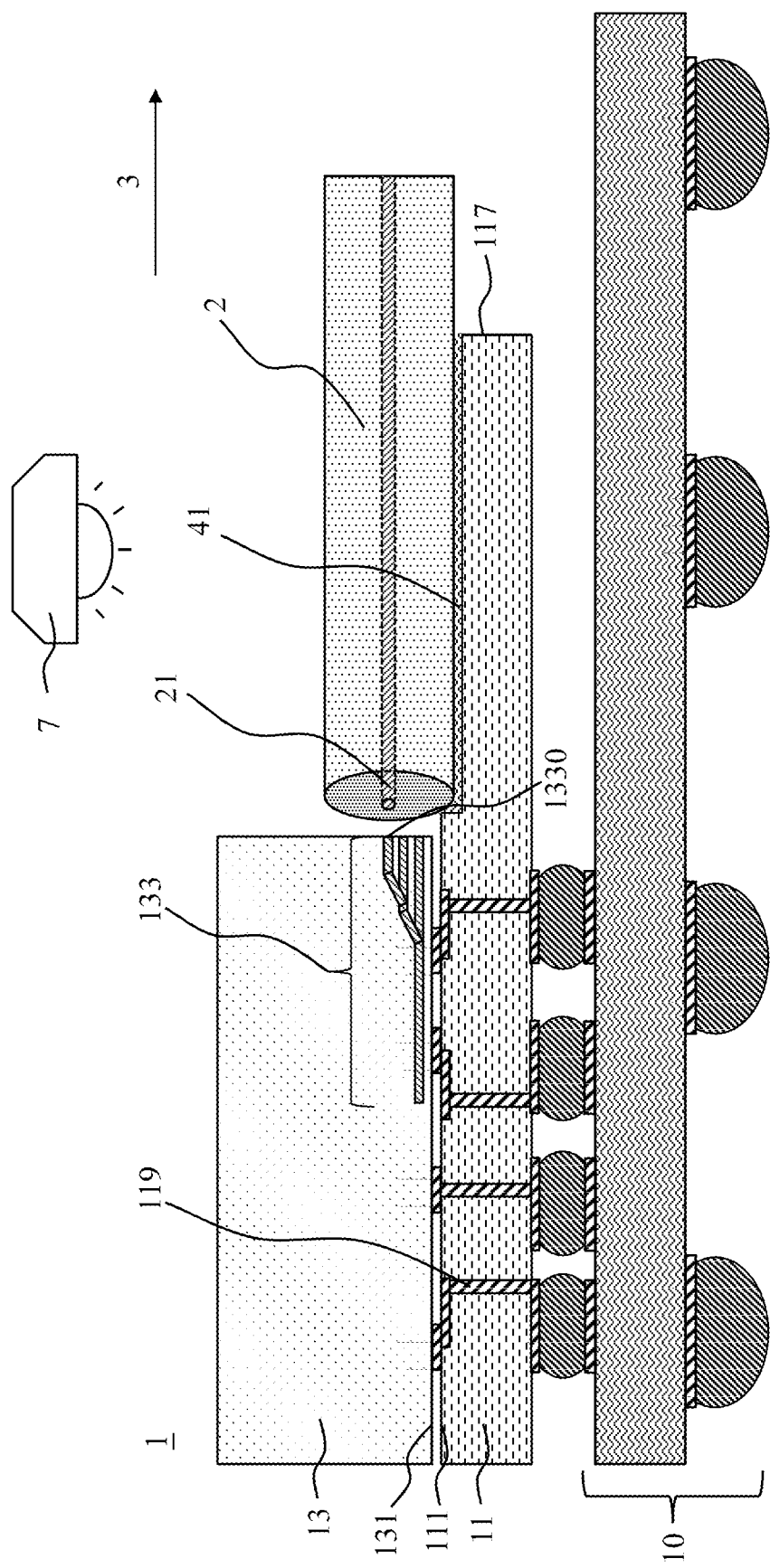

In some embodiments, the method further comprises disposing an adhesive 41 within the trench 113 for fixing the optical component 2. In some embodiments, the method further comprises connecting the optical component 2 to the trench 113 with an adhesive 41. The adhesive 41 may include an epoxy, a resin, or other suitable materials. As shown in FIG. 9H, the adhesive 41 is disposed into the trench with a nozzle 7. The optical component 2 is temporally removed so as to dispose the adhesive 41. However, the aligned X-Y-Z location of the optical component 2 is memorized. FIG. 9I shows that after disposing the adhesive 41, the optical component 2 is disposed right back to its aligned location, and that, in some embodiments, the adhesive 41 is cured with an UV lamp 8 for fixing the optical component 2.

In some embodiments, the photonic die 13 is disposed onto the electronic die 11 before the optical component 2 is disposed onto the electronic die 11. Since the photonic die 13 is disposed onto the electronic die 11, functional tests can be applied to the electronic die 11 and the photonic die 13 before disposing the optical component 2 to prevent installing optical component 2 onto a failure module of the electronic die 11 and the photonic die 13.

The optoelectronic structure 1 of FIG. 3 can be formed by methods similar to the method of manufacturing semiconductor device packages shown in FIG. 9A, FIG. 9B, FIG. 9C, FIG. 9D, FIG. 9E, FIG. 9F, FIG. 9G and FIG. 9H.

Present disclosure provides an optoelectronic structure in SiPh technology realizing high speed signal transmission. An optoelectronic structure has been developed for a requirement of connecting an optical fiber with a photonic IC. Since forming a trench on a photonic IC for positioning the optical fiber may lead to crack or broken of the photonic wafer, a trench is formed on an electronic IC instead, and an optical waveguide for coupling lights in vertical direction is provided in the photonic IC so as to transfer lights between the optical fiber and the photonic IC. A trench formed on an electronic IC is less likely to cause warpage of the IC due to the CTE mismatch between layers in the IC than a trench formed on a photonic IC.

As used herein, the singular terms "a," "an," and "the" may include plural referents unless the context clearly dictates otherwise.

As used herein, the terms "connect," "connected," and "connection" refer to an operational coupling or linking. Connected components can be directly or indirectly coupled to one another, for example, through another set of components.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the terms "approximately," "substantially" "substantial," and "about" refer to a considerable degree or extent. When used in conjunction with an event or situation, the terms can refer to instances in which the event or situation occurs precisely as well as instances in which the event or situation occurs to a close approximation, such as when accounting for typical tolerance levels of the manufacturing methods described herein. For example, when used in conjunction with a numerical value, the terms can refer to a range of variation less than or equal to $\pm 10\%$ of that numerical value, such as less than or equal to $\pm 5\%$, less than or equal to $\pm 4\%$, less than or equal to $\pm 3\%$, less than or equal to $\pm 2\%$, less than or equal to $\pm 1\%$, less than or equal to $\pm 0.5\%$, less than or equal to $\pm 0.1\%$, or less than or equal to $\pm 0.05\%$. For example, two numerical values can be deemed to be "substantially" the same or equal if a difference between the values is less than or equal to $\pm 10\%$ of an average of the values, such as less than or equal to $\pm 5\%$, less than or equal to $\pm 4\%$, less than or equal to $\pm 3\%$, less than or equal to $\pm 2\%$, less than or equal to $\pm 1\%$, less than or equal to $\pm 0.5\%$, less than or equal to $\pm 0.1\%$, or less than or equal to $\pm 0.05\%$.

Additionally, amounts, ratios, and other numerical values are sometimes presented herein in a range format. It is understood that such range formats are used for convenience and brevity, and should be interpreted flexibly to include numerical values explicitly specified as limits of a range, as well as all individual numerical values or sub-ranges encompassed within that range, as if each numerical value and sub-range is explicitly specified.

In the description of some embodiments, a component provided "on" or "over" another component can encompass cases where the former component is directly on (e.g., in physical contact with) the latter component, as well as cases where one or more intervening components are located between the former component and the latter component.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims.

The construction and arrangement of the structures and methods as shown in the various example embodiments are illustrative only. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

What is claimed is:

1. An optoelectronic structure, comprising:
   a substrate;
   an electronic die disposed on the substrate and comprising a first surface; and
   a photonic die disposed on the first surface of the electronic die and having an active surface facing the first surface of the electronic die and a side surface angled with the active surface,
   wherein the photonic die comprises a plurality of waveguides having a plurality of ends exposed from the side surface of the photonic die, and the plurality of ends are at different elevations with respect to the substrate;
   wherein the plurality of waveguides comprise a first waveguide and a second waveguide at an elevation different from an elevation of the first waveguide, and the photonic die further comprises a first tilted waveguide coupling the first waveguide to the second waveguide; and
   wherein the plurality of waveguides further comprise a third waveguide at an elevation different from the elevation of the first waveguide and the elevation of the second waveguide, and the photonic die further comprises a second tilted waveguide coupling the second waveguide to the third waveguide.

2. The optoelectronic structure of claim 1, wherein the photonic die further comprises a collector waveguide connected to the second tilted waveguide and the second waveguide and configured to collect light from the plurality of waveguides.

3. The optoelectronic structure of claim 1, wherein the electronic die further comprises a through via penetrating the electronic die and electrically connecting the first surface of the electronic die to the substrate.

4. The optoelectronic structure of claim 3, wherein a projection of the through via on the substrate is within a projection of the plurality of waveguides on the substrate.

5. The optoelectronic structure of claim 1, wherein the electronic die is configured to support an optical component and amplify at least one electronic signal.

6. An optoelectronic structure, comprising:
   a substrate;
   an electronic die disposed on the substrate and comprising a first surface; and
   a photonic die disposed on the first surface of the electronic die and having an active surface facing the first surface of the electronic die and a side surface angled with the active surface,
   wherein the photonic die comprises a plurality of waveguides having a plurality of ends exposed from the side surface of the photonic die, and the plurality of ends are at different elevations with respect to the substrate;
   wherein the photonic die further comprises a collector waveguide connected to the plurality of waveguides and configured to collect light from the plurality of waveguides;
   wherein the plurality of waveguides comprise a first waveguide and a second waveguide at an elevation different from an elevation of the first waveguide, and the photonic die further comprises a first tilted waveguide coupling the first waveguide to the second waveguide;
   wherein the electronic die further comprises a through via penetrating the electronic die and electrically connecting the first surface of the electronic die to the substrate; and
   wherein the electronic die is configured to support an optical component and amplify at least one electronic signal.

7. The optoelectronic structure of claim 1, wherein the photonic die further comprises a collector waveguide connected to the plurality of waveguides and configured to collect light from the plurality of waveguides.

* * * * *